United States Patent [19]
Onishi et al.

[11] Patent Number: 4,802,113
[45] Date of Patent: Jan. 31, 1989

[54] PIPELINE CONTROL SYSTEM

[75] Inventors: Katsumi Onishi, Kawagoe; Yuji Oinaga, Setagaya; Kohei Otsuyama, Kawasaki, all of Japan

[73] Assignee: Fujutsu Limited, Kawasaki, Japan

[21] Appl. No.: 758,665

[22] PCT Filed: Nov. 8, 1984

[86] PCT No.: PCT/JP84/00535

§ 371 Date: Jun. 25, 1985

§ 102(e) Date: Jun. 25, 1985

[87] PCT Pub. No.: WO85/02279

PCT Pub. Date: May 23, 1985

[30] Foreign Application Priority Data

Nov. 11, 1983 [JP] Japan .............................. 58-212021
Nov. 30, 1983 [JP] Japan .............................. 58-225623

[51] Int. Cl.⁴ .................................................. G06F 9/00
[52] U.S. Cl. .................................................. 364/900
[58] Field of Search ............................... 364/200, 900

[56] References Cited

U.S. PATENT DOCUMENTS 4,040,031  8/1977  Cassonnet ...................... 364/200
4,200,927  4/1980  Hughes et al. .................. 364/200

FOREIGN PATENT DOCUMENTS 0036093  2/1981  European Pat. Off. .
0066376  6/1982  European Pat. Off. .

OTHER PUBLICATIONS

EP 8490 4162—Supplementary European Search Report.

Primary Examiner—Gareth D. Shaw
Assistant Examiner—John G. Mills
Attorney, Agent, or Firm—Staas & Halsey

[57] ABSTRACT

According to the present invention, an instruction address register unit I for reading instructions and an instruction address register unit II for indicating the address of the instruction being executed in the pipeline are provided independently. The address of a branching instruction is held in the instruction address register unit II until said instruction passes through the pipeline, the content of instruction address register unit I is updated when branching of the branching instruction is determined, and thereby delay in reading an instruction after 8 bytes at the branching address can be reduced.

5 Claims, 3 Drawing Sheets

PIPELINE CONTROL SYSTEM

CROSS REFERENCE TO RELATED APPLICATIONS

This application is related to U.S. applications having Ser. Nos. 755,321; 758,664 and 752,190.

BACKGROUND OF THE INVENTION

1. Field of the Invention

The present invention relates to a pipeline control system, particularly to a pipeline control system in a data processing unit of the pipeline control type wherein the processing is carried out at a high speed when a branching instruction is executed.

2. DESCRIPTION OF THE RELATED ART

Data processing units of the pipeline control system type, which execute the processes of instruction fetch and execution of relevant instructions using pipeline control systems of this type are accompanied by problems concerning how to reduce the "waiting" condition time which is generated when needed data or instructions do not exist in the cache memory and concerning how to execute alternate processing smoothly when the instruction sequence is altered due to the establishment of a branching condition or an interruption.

The problem associated with the "waiting" condition can be solved to a certain degree by increasing the capacity of the cache memory, however, the problem related to alternate processing of an instruction sequence concerning how to quickly read the branching address instruction of a branching instruction still remains even with an increased size cache memory.

Meanwhile, when forming certain logical functions the recent trend to high density integration of logical circuits must be considered, especially when the number of logical elements increases, and if the hardware can reduce the number of input/output terminals of each logical block, performance of the system as a whole can be improved.

Figure 1:
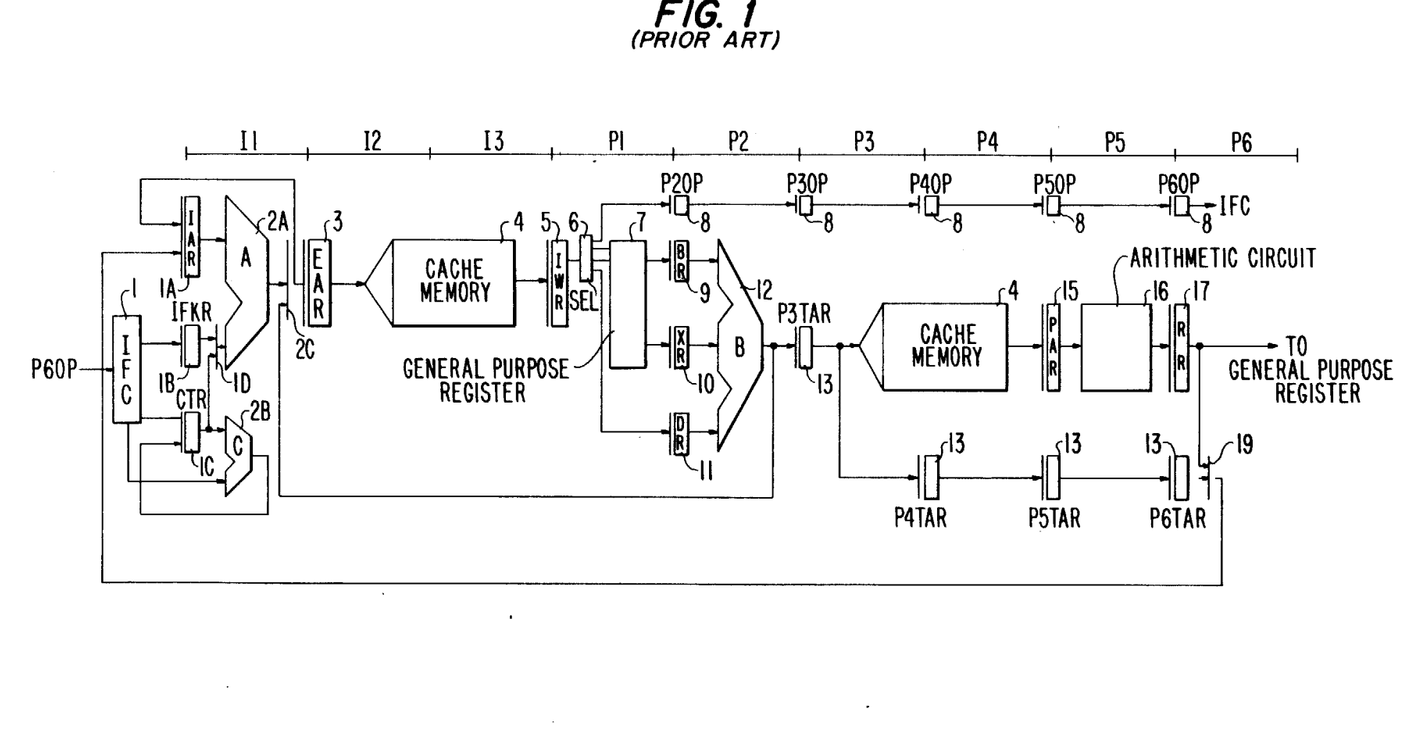
FIG. 1 is a schematic profile of a pipeline operation in the prior art system.

The prior art is first explained and the problems of the prior are discussed. FIG. 1 is a schematic profile of a pipeline operation in a data processing unit with pipeline control according to the prior art. In this figure, I1-I3 are pipeline stages for instruction fetch, while P1-P6 are pipeline stages for execution of instructions, namely the operand fetch and calculation. The general operations of a data processing unit with pipeline control are explained with reference to FIG. 1. First, the heading address of a microprogram to be executed is loaded into the instruction address register (hereinafter referred to as IAR) 1A from a service processor (not shown) in stage I1 of the pipeline of this data processing unit. In this case, since "0" is loaded into the instruction fetch constant register (hereinafter referred to as IFKR) 1B, the content of IAR 11 is directly loaded into the execution address register (hereinafter referred to as EAR) through the adder (A) 2A in stage I2. The cache memory 4 is accessed by EAR 3 and thereby relevant micro instructions are read out and loaded into the instruction word register (hereinafter referred to as IWR) at the end of stage I3.

After the first instruction is read as explained above, a fixed value of "8" is loaded into IFKR 1B from the instruction fetch control part (IFC) 1, and added to the content of IAR 1A by the adder (A) 2A, and the execution address is calculated and loaded into the EAR 3. As a result, the micro instruction read into IWR 5 is loaded in units of 8 bytes. The IWR 5 is generally composed of a multi-stage shift register and the boundary address of plural instructions stored in the IWR 5 can be obtained from a pointer register (not shown).

A selector (SEL) 6 selects the instruction to be executed in the pipeline in accordance with the address indicated by the pointer register When the relevant instruction is selected by the selector (SEL) 6 in stage P1 of the pipeline, the operation code area of the instruction is shifted via the operation code registers P20P-P60P(8) corresponding to the stages P2-P6 and is used when the instruction is executed at respective stages.

The register designation area of the instruction is decoded, the general purpose register is accessed based on the decoded address and the base address and index value are respectively read into the base register (BR) 9 and index register (XR) 10. The displacement designation area of the instruction is loaded into the displacement register (DR) 11.

At stage P2, the content of the base register (BR) 9, the content of the index register (XR) 10 and the content of displacement register (DR) 11 are added in the adder (B) 12, as a result, the operand address is calculated and then stored in the address register (P3TAR) 13 of stage P3 and the operand fetch is carried out by accessing the cache memory 4.

A result of the operand fetch is read into the operand word register (OWR) 15 at the end of stage P4, and is calculated by the operation circuit 16 in the next stage P5. The result is loaded into the result register (RR) 17 at the beginning of stage P6 and is stored in the general purpose register 7 in stage P6.

At stage P1 mentioned above, the following operations are carried out in addition to instruction execution address calculation.

Namely, when the instruction execution address is calculated, a fixed value (for example, "8"), loaded into the instruction fetch constant register (IFKR) 1B, is accumulated by counter (CTR) 1C for each addition by the adder (A) 2A.

The operation code of the instruction extracted from the pipeline is detected by the instruction operation part register (P60P) in stage P6 and it is then sent to the instruction fetch control part (IFC) 1. As a result, the length of the instruction extracted from the pipeline (number of bytes) can be detected and it is subtracted from a value stored in counter (CTR) 1C by the adder (c) 2B. As a result, the counter (CTR) 1C contains the length of all instructions being processed in the pipeline and means that [IAR 1A]−[Counter(CTR)1C]=address of instruction in the stage P6.

The reason why this value is necessary will be explained later. When this operation is necessary, it is executed by subtracting a value of counter (CTR) 1C from IAR 1A in the adder (A) 2A.

The prior art has the feature that the instruction address register for reading the instruction and the instruction address register indicating the address of the instruction being executed in the pipeline are used in common.

Operations for general pipeline instructions are explained above and operations for branching instructions which are used in the present invention and how they are used in the prior art are explained below with reference to the time chart of FIG. 3.

When the instruction (indicated by N) read by IWR 5 is a branching instruction, the operand address calculated by the adder(B) 12 indicates the branching address. The address is stored in the target address registers P3TAR-P6TAR during respective stages P3-P6 and then shifted. Simultaneously, the branching address is loaded into the EAR 3 through the OR circuit 2C at the stage P2 (corresponding to the stage I1 in the case of the branching address instruction). Thereafter, the cache memory 4 is accessed to read the branching instruction (indicated by m, m+1, ... ).

At the stage P4, the operation of the instruction (indicated as n−1), just preceding the branching instruction, is being carried out (for the instruction n−1, at the stage P5). If branching conditions are positively determined by the operation result, the branching address instruction being accessed is read into the IWR 5 and the branching instruction is executed at the respective stages of P1-P6.

Figure 3:
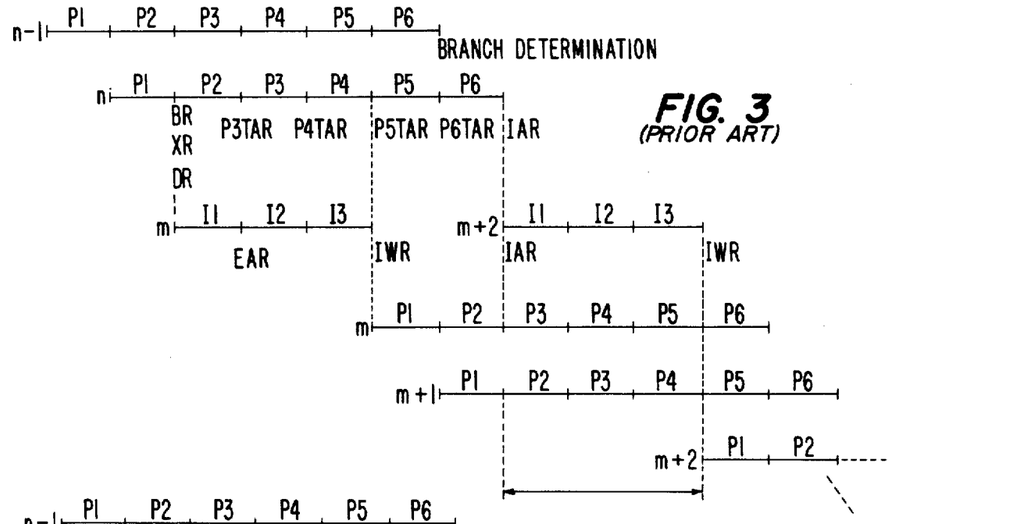
FIG. 3 shows a time chart of the operation when a branching instruction is executed in the pipeline system of the prior art.

In the time chart of FIG. 3, operations in the pipeline (at the stages P1-P6) of the branching address instruction (here, the 8 bytes read in this case are supposed to be two 4-byte instructions) are indicated by m and m+1.

In the prior art system, the branching address instruction m+2 can be read as follows: The branching address stored in the target register P6TAR in stage P6 of the branching instruction n is loaded into the IAR 1A through the OR circuit 19, a value of IFKR 1B ("8") is added in the adder(2) A at the stage I1 of the branching address instruction, the execution address after 8 bytes from the address of branching address instruction m is loaded into the EAR 3 at the stage I2, thus the branching address instruction m+2 can be read by addressing the cache memory 4.

After all, in the prior art system, the processings are executed at the stages I1-I3 in order to read the m+2 branching address instruction after the processing of the branching instruction n at the stage P6. Thereafter, since the m+2 instruction is executed at the stages P1-P6, as is apparent from the time chart of FIG. 3, the execution is delayed by 3 cycles from the m+1 instruction.

The prior art has no problem in the execution timing of the branching address instruction which is precedingly read when the branching condition is established by executing the branching instruction, but does have a problem in the timing of reading the branching address instruction after successive 8 bytes from the cache memory (that is, after execution of branching instruction n reaches the stage P6, the stage I1 of the branching address instruction m+2 starts).

As explained above, the branching address must be held by the target registers P3TAR-P6TAR until the stage P6 of the branching instruction n because it is checked concerning whether there is interruption or not during execution of the branching instruction n in the stage P6 and the operation result is also checked and accordingly, the content of IAR 1A cannot be changed at least until the branching instruction n is extracted from the pipeline.

For example, when considering that an error is detected in the stage P6, execution of the branching instruction n is invalidated and therefore, the instruction n must be retried and it is essential to obtain the retry address from IAR 1A.

The disadvantageous points of the prior art system can be summarized as follows. A time delay is generated for reading the instruction after 8 bytes at the branching address because the instruction address register for reading the instruction and the instruction address register indicating the instruction being executed in the pipeline are used in common, and the address of the branching instruction must be held by some means until the branching instruction has completed execution even after the branching instruction is branched because it is probable that an interruption or error may be generated during the pipeline processings.

The route from the result register (RR) 17 to the OR circuit 19 is used, for example, when branching is carried out by loading the PSW (program status word) instruction.

SUMMARY OF THE INVENTION

With such disadvantages of the prior art system, it is an object of the present invention to provide a system for reading at a high speed the instruction coming 8 bytes after the branching address which is generated when the branching instruction is executed in the data processing of the pipeline control system. Moreover, it is also an object of the present invention to provide a structure for reducing the number of instruction word buffer registers provided for continuous generation of branching instructions in the data processing unit having a pipeline control system.

This object can be attained, according to the present invention, by providing a system where first means holds N ($\geq 1$) instruction addresses for reading instructions, second means holds the addresses of M ($\geq 1$) instructions being executed in the pipeline and third means updates the addresses of instructions held by the second means when execution of respective instructions is completed. When the instruction sequence is changed before completion of execution of the oldest instruction supplied to the pipeline, the first means holding the address of the oldest instruction is used as the means for holding the instruction in order to read the instruction of the new instruction sequence and the instruction sequence is changed at a high speed. Moreover, even when the branching instruction is generated continuously, the object is attained by using in common the instruction word buffer registers, focusing on the fact that the object instructions are executed serially. The present invention has an advantage in that since the instruction address register unit I for reading instructions and the instruction address register unit II for indicating the address of the instruction being executed in the pipeline are provided individually, the content of the instruction address register unit I can be updated when the branching of the branching instruction is determined and the delay for reading the instruction coming 8 bytes after the branching is removed.

Briefly, according to the present invention, the instruction address register unit I for reading instructions and the instruction address register unit II for indicating the address of the instruction being executed in the pipeline are provided independently, the address of the branching instruction is held by the instruction address register unit II until the instruction passes through the pipeline, the content of the instruction address register unit I can be updated when branching of the branching instruction is determined and the delay necessary for reading of the instruction after 8 bytes at the branching address is compensated.

DESCRIPTION OF THE PREFERRED EMBODIMENTS

Figure 2:
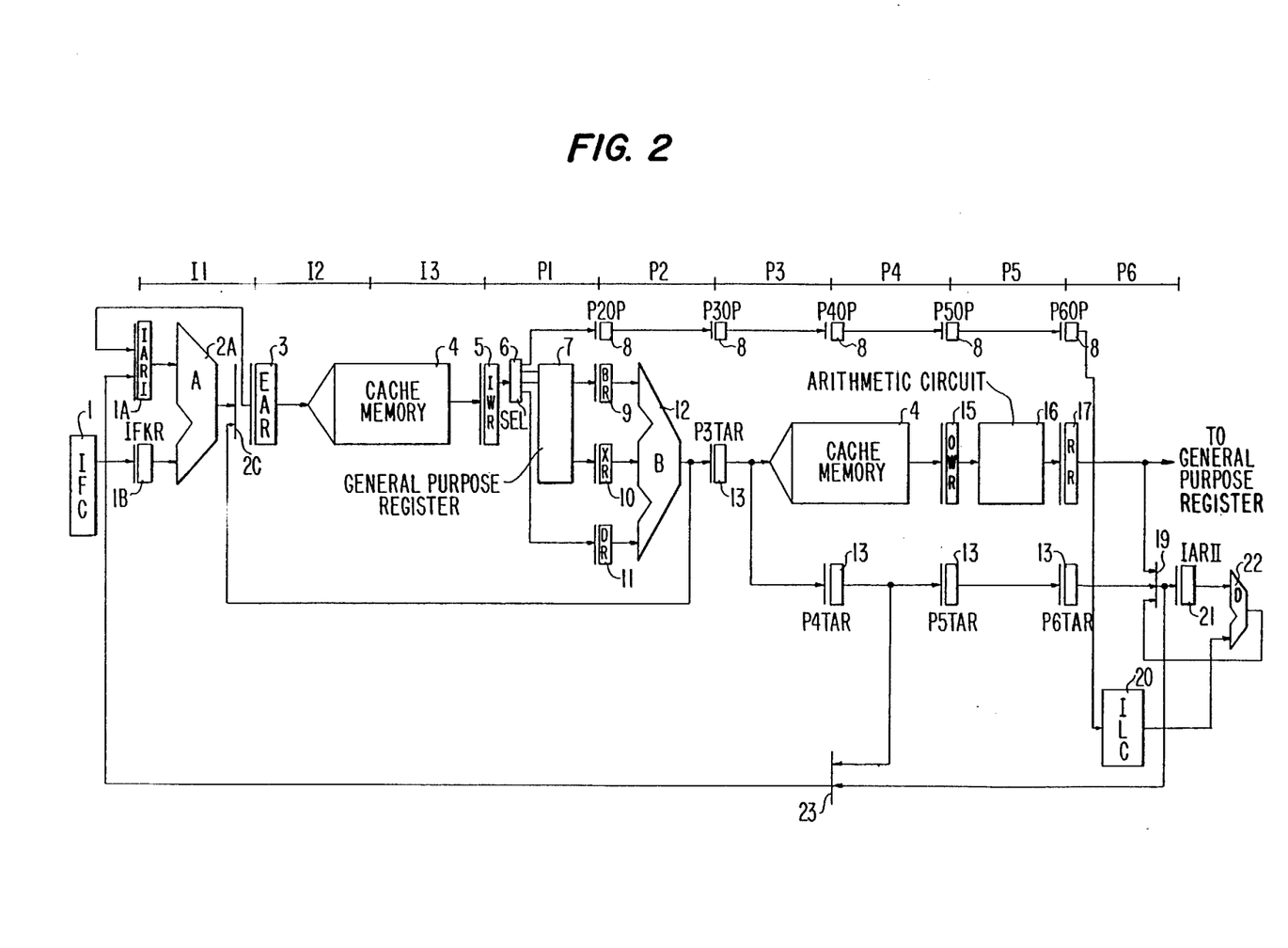
FIG. 2 is a schematic profile of a pipeline operation in the system of the present invention.
Figure 4:
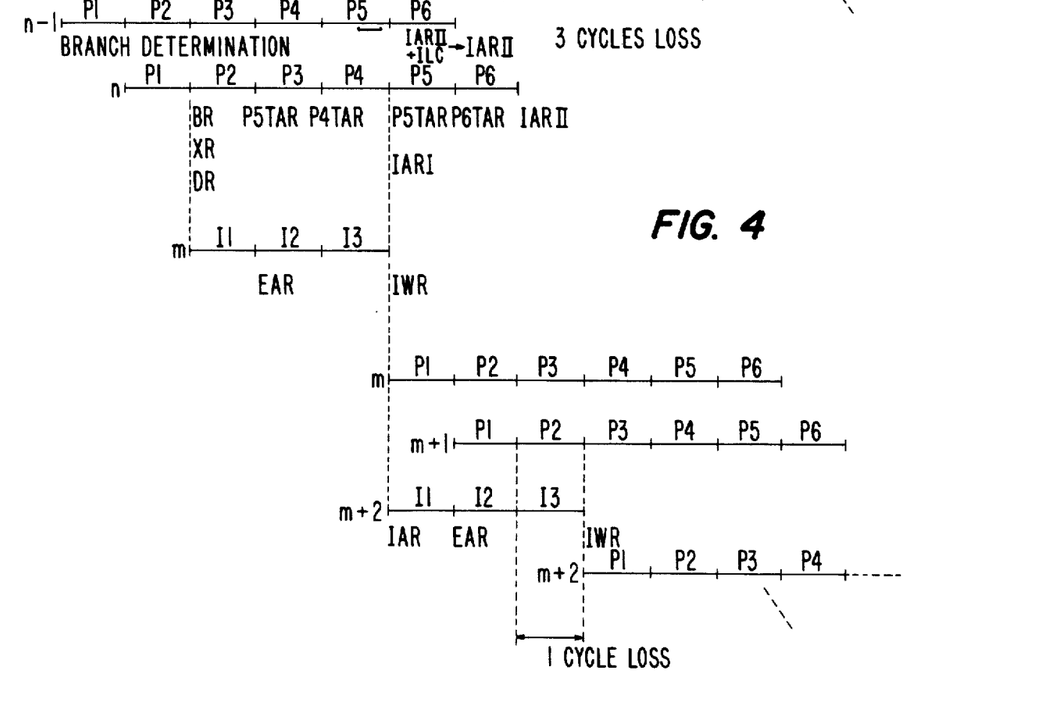
FIG. 4 shows a time chart of the operations when a branching instruction is executed in the pipeline to which the present invention is applied.

An embodiment of the present invention is described in detail by referring to the drawings. FIG. 2 is a block diagram of an embodiment of the present invention FIG. 4 is for the embodiment shown in FIG. 3 and is a time chart of the operations when the branching instruction is executed.

In FIG. 2, reference characters 1A, 1B, 2A, 2C, 3 and 19 are the same as those shown in FIG. 1. 20–23 are logical blocks for the present invention, comprising an instruction address register unit II which indicates the address of instruction being executed in the pipeline. Namely, 20 is an instruction length generating circuit (ILC), 21 is an instruction address register II(IAR II), 22 is an adder D and 23 is an OR circuit.

In FIG. 2, as in the case of FIG. 1, each element is used in such a timing that respective processings are executed in each state successively through stages I1, I2, I3, P1, P2, P3, P4, P5 and P6. The hardware construction in the embodiment of the present invention is essentially the same as that shown in FIG. 2, except that the cache memory 4 is shown over-lapping. It is a matter of course that two separate cache memories 4 can be provided as shown in FIG. 2.

When the present invention is put into practice, it should be noted that the instruction address register unit I and the instruction address register unit II are independent of each other.

The general pipeline operation when the present invention is used is the same as the prior art and will not be explained here. Explained herein by referring to the time chart of FIG. 4 is the embodiment of the present invention, focusing on the effects of the invention when the branching instruction is executed.

Even when the present invention is applied, the heading address of the program to be executed is first loaded into the two instruction address registers I, II [IAR(I) 1A, IAR(II) 21]from the service processor (not shown) in the stage I1 of the pipeline of this data processing unit.

The instruction address register (IAR I) 1A operates in the same way as the prior art. But with respect to the instruction address register II(IAR II) 21, the instruction length of the instruction is generated in the instruction length generating circuit (ILC) 20 for each completion of execution of one instruction and the length is added to the instruction address register II (IAR II). Therefore, the address of the oldest instruction of the instructions to be executed by said pipeline is located in IAR II when such addition is completed.

Accordingly, even when the branching instruction is executed, the address of the branching instruction is held in the instruction address register II (IAR II) 21, until the branching instruction runs through the pipeline.

As explained in FIG. 1 and FIG. 3, the embodiment is explained by referring to FIG. 4 where the branching instruction is considered as flow n while the branching address instructions are flow m, m+1, m+2.

When the instruction (indicated as n) read into IWR 5 is the branching instruction, the operand address calculated in the adder (B) 12 indicates the branching address. The branching address is stored in the target registers P3TAR–P6TAR and shifted through the stages P3–P6 and the branching address is loaded into the EAR 3 through the OR circuit 2C in the stage P2 (stage I1 for the branching address instruction). Thereafter, the cache memory 4 is accessed and the branching address instruction (indicated as flow m, m+1,...) is read.

In the stage P4, it is supposed that operation of the instruction (n−1) just before the branching instruction is carried out (namely stage P5 for the instruction (n−1)) and the branching condition is determined as the result of such operation, the branching address instruction being assessed is read into the IWR 5 at the end of the stage I3, and execution of stages P1 to P6 of the branching address instruction is carried out.

In the time chart of FIG. 4, operations in the pipeline (stages P1–P6) of the branching address instruction (the 8 bytes read at this time should be considered as two 4-byte instructions) are indicated by m and m+1.

As is apparent from the figure, the operations until this step are the same as those in the prior art system.

When reading the successive branching address instruction m+2, at the stage P4 of the branching instruction n in the present invention, the branching address stored in the target register P4TAR is loaded into IAR (I) 1A through the OR circuit 23, a value ("8") of IFKR 1B is added to the adder (A) 2A at the stage I1 of the branching address instruction m+2 and the execution address 8 bytes after the address of the branching address instruction m is loaded into the EAR 3 at the stage I2.

Therefore, when the present invention is applied, since execution of stages I1–I3 for reading the m+2 branching address instruction is started at the end of the stage P4 of the branching instruction n, delay is not generated between the reading operation for the branching address instructions m, m+1 (namely, stages I1–I3) and the reading operation for the instruction m+2 8 bytes after the branching address instruction m (stages I1–I3). Thereafter, the stages P1–P6 of the m+2 instruction are executed and, as is apparent from the time chart of FIG. 4, delay after the m+1 instruction is reduced to only one cycle.

When the present invention is applied as explained above, the address of the m+2 instruction is loaded into the IAR (I) 1A in order to start execution for the stages I1–I3 for reading the branching address instruction m+2 at the stage P4 of the branching instruction n and the address of branching instruction n is destroyed before completion of the branching instruction. However, since the address of the branching instruction n is held in the instruction address register II (IAR II) 21 until the branching instruction n passes through the stage P6 as explained above, as explained with respect to the prior art system, an error is detected in stage P6 and even if it is required to retry the branching instruction n, the instruction can be read again by loading again the content of the instruction address register II(IAR II)21 into the instruction address register I (IAR I) 1A through the adder (D) 22, OR circuits 19 and 23, resulting in no problem.

According to the present invention as explained above, cycle loss normally generated in the pipeline can be reduced even when the branching conditions are determined and the branching instruction can be processed at a high speed.

Although not shown in FIG. 3 and FIG. 4, while the branching address instructions m, m+1 are read, the successive instructions of branching instruction n (so called n+1, n+2, ...) are sequentially put into the stage P1 for the case where the branching conditions are not determined by the branching instruction n. For example, in FIG. 4, when the branching condition is determined in the stage P4 of branching instruction n, the instructions n+1, n+2 and n+3 which have been input are cancelled and the branching address instruction m is input into the stage P1. In this case, the instructions n+1, n+2, n+3, etc., which have been buffered in the instruction word register IWR 5 are input to the pipeline.

In the above explanation related to FIG. 1 and FIG. 3, the instruction word register (IWR) 5 is only described as being generally composed of a multistage shift register. But when the branching instruction n appears as shown in FIG. 4, it is desirable that the instruction word register for holding the instructions n+1, n+2, ... when the branching is not successful is provided together with the instruction word register for holding the branching address instruction m when the branching is successful in case the branching instruction n shown in FIG. 4 appears and thereby any desired instruction can be extracted. Moreover, individual instruction word registers are also prepared for the case where the branching instructions appears continuously.

Figure 5:
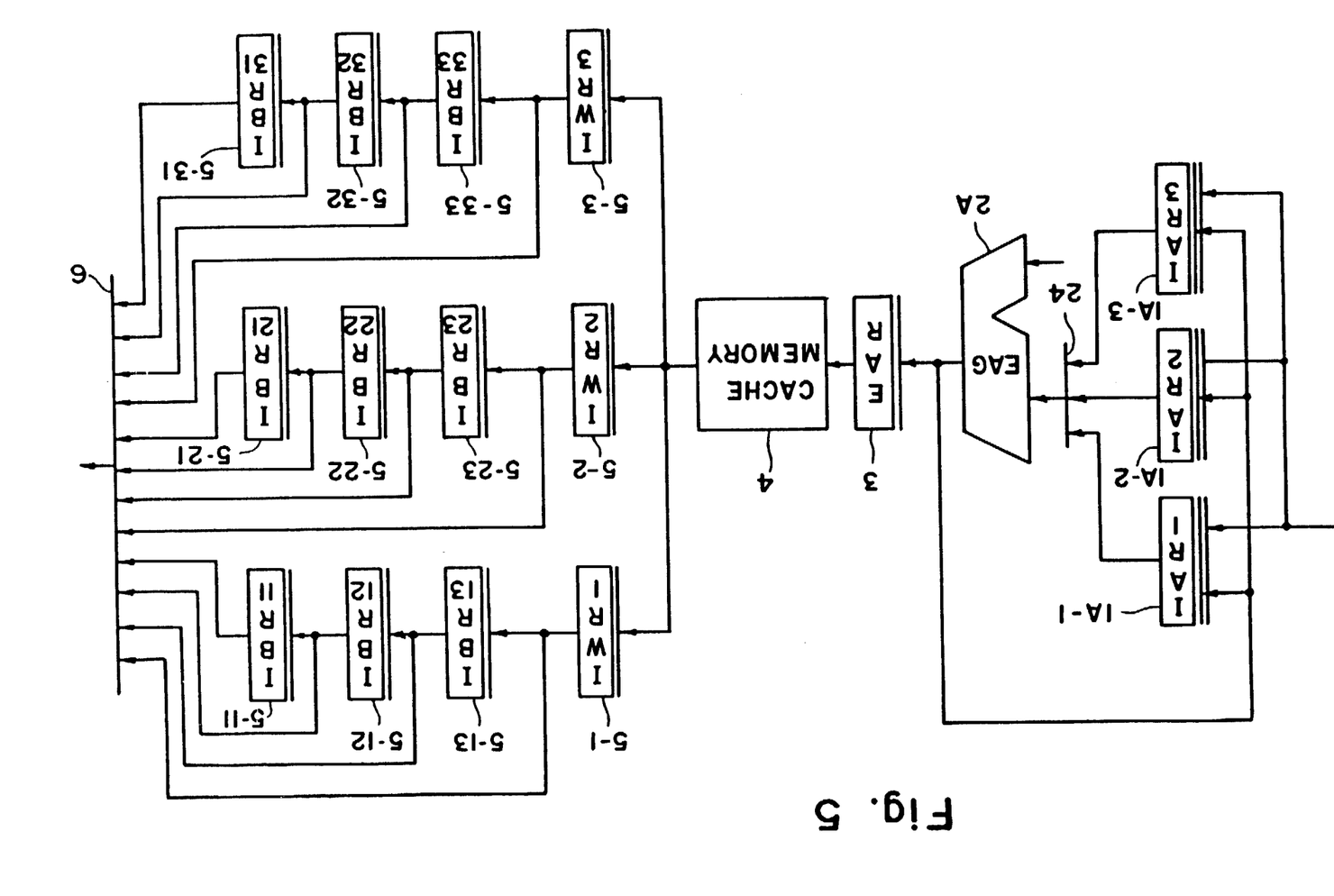
FIG. 5 shows an example of the constitution of an instruction buffer register when considering continuous generation of branching instructions.

Considering this construction, the instruction address register (IAR I) 1A and the instruction word register (IWR) 5 shown in FIG. 1 are overlapped in parallel as shown in FIG. 5. In this figure, symbols 2A, 3, 4 and 6 correspond to those in FIG. 2. Moreover, 1A-1 to 1A-3 are instruction address registers corresponding to the instruction address register (IAR I) 1A shown in FIG. 2; 5-1 to 5-3 are instruction word registers corresponding to instruction word register (IWR) shown in FIG. 2; 5-13 to 5-11 are instruction word buffer registers located at the successive stage of instruction word register 5-1; 5-23 to 5-21 are instruction word buffer registers located at the successive stage of instruction word register 5-2; 5-33 to 5-31 are instruction word buffer registers located at the successive state of instruction word register 5-3; and 24 is a selector.

When encountering instructions other than the branching instruction, as explained with respect to FIG. 1, the execution address determined by IAR 1A-1 and adder 2A is loaded into the EAR 3 and the instruction read from the cache memory 4 is loaded into the IWR 5-1 based on the executing address. With continuation of an instruction fetch, the instruction being loaded into IWR 5-1 is shifted to the instruction word buffer register (IBR 13) 5-13, the instructions are shifted sequentially through the instruction buffer registers IBR 5-13, IBR 5-12 and IBR 5-11 in a form such that the instruction newly read from the cache memory 4 is loaded into the IWR 5-1, and such instruction is sent to the pipeline through the selector 6.

When the branching instruction appears, a train of instructions are held in the IWR 5-1, IBR 5-13, IBR 5-12 and IBR 5-11 where the branching is not successful, without regard to successful or not successful branching by the relevant branching instruction. A train of instructions for successful branching are obtained on the basis of the content of IAR 1A-2 and are held in the IWR 5-2, IBR 5-23, IBR 5-22 and IBR 5-21. In case the branching instruction appears continuously, a train of necessary instructions is held in the IWR 5-3, IBR 5-33, IBR 5-32 and IBR 5-31.

However, in the case of the structure shown in FIG. 5, the instruction word buffer register (IBR) becomes large and complicated in circuit details and the constitution of selector 6 is also complicated.

As is explained by referring to FIG. 4, when the apparatus shown in FIG. 2 is employed, it is determined in the stage P4 for the branching instruction n that the branching corresponding to the branching instruction n is successful or not successful. This timing appears just one cycle before the stage P1 of relevant branching address instruction m, regarding said branching address instruction m where the branching is successful. The timing appears just one cycle before the stage P1 of relevant branching address instruction m, regarding said branching address instruction m where the branching is successful. The timing appears just one cycle before the stage $I_1$ of the relevant branching address instruction m+2, regarding the instruction m+2 in the side of branching address read out next. That is, if branching is successful, the instructions n+1, n+2 and n+3 which are fetched on the supposition that the branching is not successful, when the branching address instruction m is loaded into the instruction word register IWR 5-2, are cancelled. Moreover, if branching is not successful, the instructions are fetched on the supposition that the branching may be carried out and are cancelled after the instruction m is loaded into the instruction word register IWR 5-2.

Figure 6:
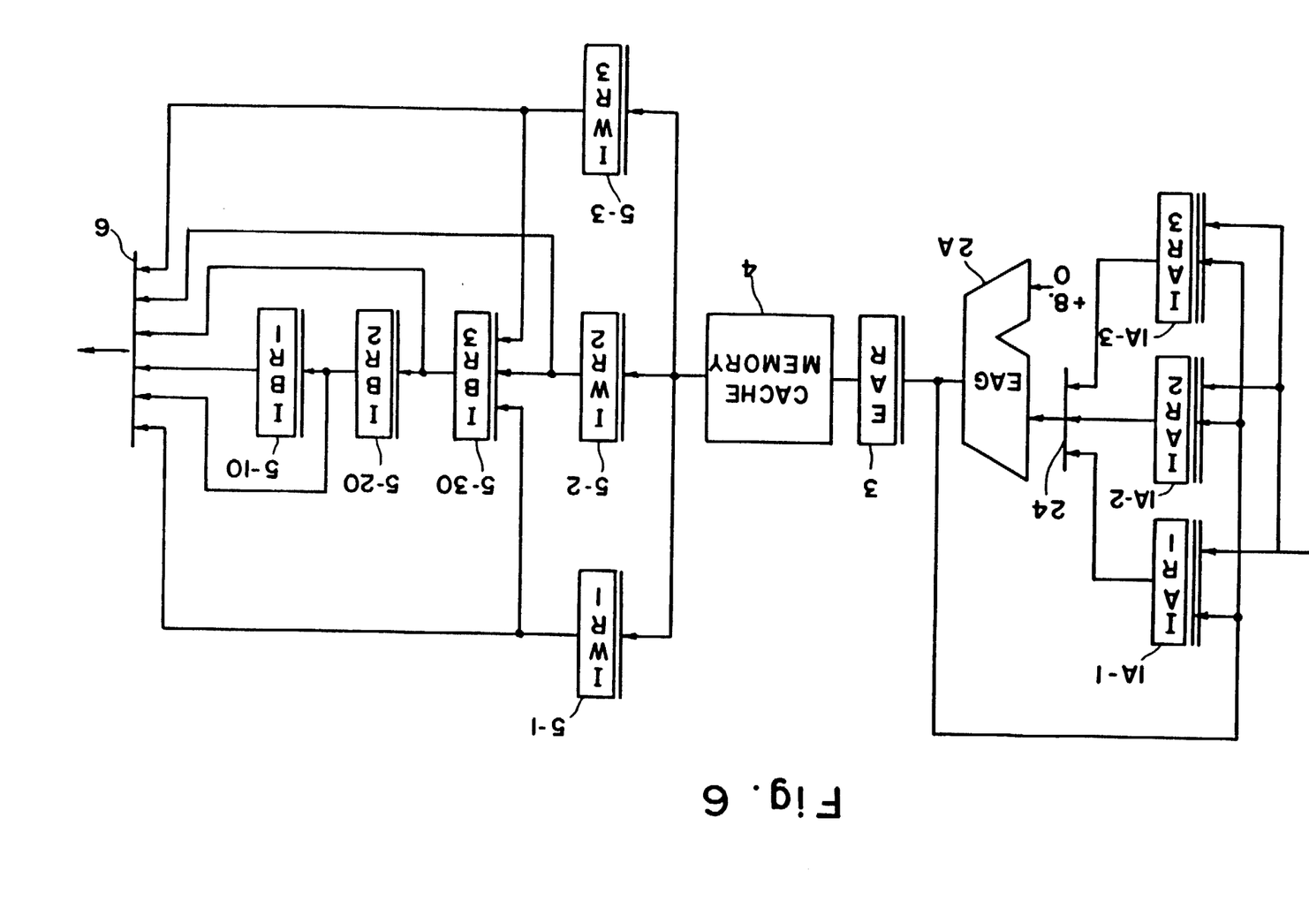
FIG. 6 shows an embodiment of the present invention where the device shown in FIG. 5 is improved.

FIG. 6 shows the constitution of an embodiment where FIG. 5 is improved, when considering the timing for successful or not successful branching. In FIG. 6, symbols 1A-1 to 1A-2, 2A, 3, 4, 5-1 to 5-3, 6 and 24 respectively correspond to those in FIG. 5, and 5-30, 5-20 and 5-10 are instruction word buffer registers. When the apparatus of FIG. 2 is employed, the successful or not successful branching is determined at such a timing that the instructions n+4, n+3, n+2 and n+1 for unsuccessful branching are sequentially located at the IWR 5-1, IBR 5-30, IBR 5-20 and IBR 5-10 and the instruction m for successful branching is located at the IWR 5-2. Therefore, the instruction word buffer registers IBR can be summarized in a so-called single system by employing the constitution shown in FIG. 6.

Even when the branching occurs continuously, the successful or unsuccessful branching of successive branching instructions are determined when a heading instruction for successful branching exists in the register IWR 5-3, under the condition that a train of instructions for unsuccessful branching corresponding to the branching instruction appearing successively is held in the register IWR 5-2, IBR 5-30, IBR 5-20 and IBR 5-10. That is, the constitution shown in FIG. 6 can be employed.

We claim:

1. A pipeline processing system, comprising:

a first instruction address register for holding a first address of an instruction of be fetched;

instruction fetch means, operatively connected to said first instruction address register, for fetching an addressed instruction;

address calculation means, operatively connected to said instruction fetch means, for calculating one of an operand address and a branching address, said instruction fetch means fetching one of an instruction identified by the branching address and an operand identified by the operand address;

operation code pipeline means, operatively connected to said instruction fetch means, for carrying an operation code of the fetched instruction;

operation means, operatively connected to said address calculation means, for performing an operation designated by the fetched instruction;

address register pipeline means, operatively connected to said address calculation means, for holding the branching address of the instruction identified by said branching address and having an intermediate and a final stage, said intermediate and final stages being operatively connected to said first instruction address register and holding addresses produced by said address calculation means;

a second instruction address register, operatively connected to the final stage of said address register pipeline means, for holding a second address of an oldest instruction being processed in said pipeline processing system; and replacement means, operatively connected to instruction fetch means, said first instruction address register and said second instruction address register, for replacing the first address with an incremented branching address when said operation means performs a branch operation based on a branch instruction.

2. A pipeline system according to claim 1, wherein said first instruction address register comprises parallel connected instruction registers.

3. A pipeline system according to claim 2, wherein said instruction fetch means comprises:

a cache memory, operatively connected to said parallel connected instruction registers, for storing instructions;

parallel connected instruction word registers, operatively connected to said cache memory, for storing instructions output by said cache memory;

an instruction buffer, operatively connected to said parallel connected instruction word registers, for buffering instructions output by said instruction word registers; and a selector, operatively connected to said parallel connected instruction word registers, said instruction buffer and said address calculation means, for selecting an instruction for address calculation.

4. A pipeline system according to claim 3, wherein said instruction buffer comprises instruction buffer registers, respectively operatively connected to said parallel connected word instruction word registers and to said selector for buffering the instructions output by said instruction word word registers.

5. A pipeline system according to claim 1, wherein said replacement means includes:

an instruction length generating circuit, operatively connected to said operation code pipeline means, for generating an instruction length responsive to the operation code; and an adder, operatively connected to said instruction length generating circuit, said second instruction address register and said first instruction address register, for adding the length to the second address.

* * * * *

UNITED STATES PATENT AND TRADEMARK OFFICE
CERTIFICATE OF CORRECTION

PATENT NO. : 4,802,113

DATED : January 31, 1989

INVENTOR(S) : Katsumi Onishi et al.

It is certified that error appears in the above-identified patent and that said Letters Patent is hereby corrected as shown below:

Figures 5 and 6 should be added as shown on the attached drawings.

Col. 1, line 2, "REFERENCE" s/b --REFERENCES--.

Col. 2, line 7, after "register" insert a period.

Col. 3, line 3, after "address" insert a period.

Col. 4, line 46, after "serially" insert a period.

Col. 5, line 23, after "invention" insert a period.

Col. 7, line 3, "}" s/b --)--.

Col. 9, line 2, "of", second occurrence, should be --to--.

Signed and Sealed this

Eighteenth Day of July, 1989

Attest:

DONALD J. QUIGG

Attesting Officer

Commissioner of Patents and Trademarks

Fig. 5